Aug. 12, 1930.   K. PILLER   1,772,683
VESSEL BASE PROTECTOR
Filed March 22, 1929
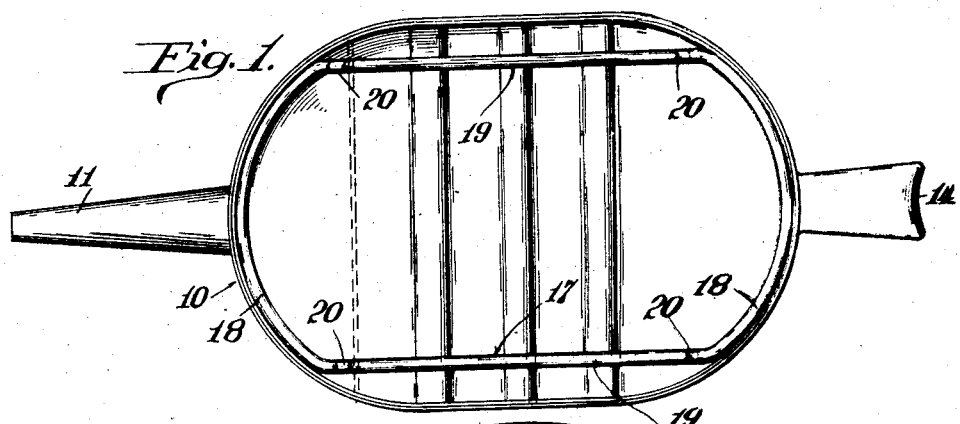
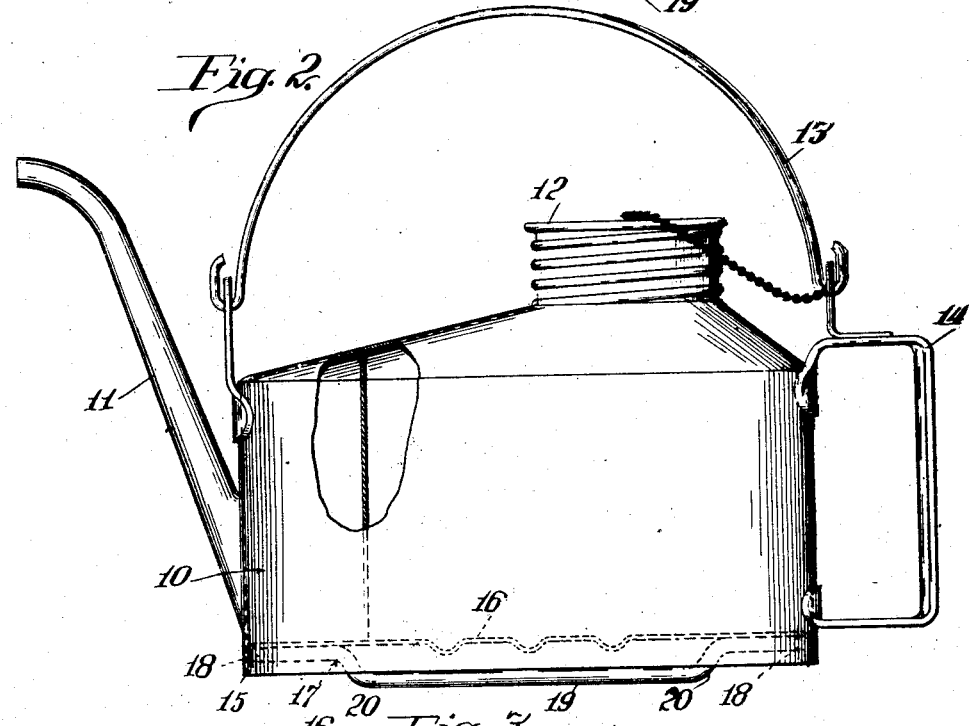
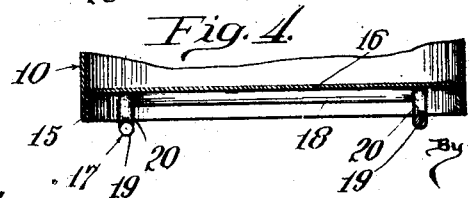

Patented Aug. 12, 1930

1,772,683

UNITED STATES PATENT OFFICE

KARL PILLER, OF ALBUQUERQUE, NEW MEXICO

VESSEL-BASE PROTECTOR

Application filed March 22, 1929. Serial No. 349,042.

My invention relates more particularly to an improved protector especially intended for tallow pots; and has for its object the provision of a device whereby the bottom of the vessel or tallow pot is provided with a shield or protector which will prevent chafing and wear of the base of the vessel or pot.

Another object of the invention is to provide a protecting device or shield which can be easily applied and also readily removed when desired without in any way affecting or altering the construction of the vessel or pot proper; a device which can be cheaply manufactured and which at the same time will resist the more or less hard usage to which it is subjected.

The objects and advantages of my invention will be readily comprehended from the following detailed description of the accompanying drawing, wherein:—

Figure 1 is an inverted plan view of a vessel provided with my improved device.

Figure 2 is a side elevation of the vessel with my device applied.

Figure 3 is a longitudinal sectional view of the bottom or lower end of the vessel and of my improved device.

Figure 4 is a cross-sectional view of the lower end or bottom of the vessel and of my device.

My device is adapted to protect the bottom or base of vessels, being especially intended for use with a well known type of tallow pot at present employed and to which it has been shown applied for purposes of exemplification.

The tallow pot shown in the drawing at 10 is of a well known type, having the usual spout 11; removable cap 12; bail 13 and handle 14. Tallow pots are usually constructed with a chime 15 formed by the extended side walls of the vessel and the flanged main bottom 16, which are disposed beneath the main bottom as shown in dotted lines in Figure 2 and in full lines in Figures 3 and 4.

As the tallow pot proper is of well kown construction and in itself forms no part of my invention, a more specific detailed description of the vessel or pot need not be entered into.

The invention comprises a protector or device which is preferably made from a metal rod or comparatively heavy wire which may be of any cross sectional configuration, being preferably shown as round in cross-section and of thickness to resist weight of the vessel or pot and its contents; that is to say, the device is made of a metallic wire or rod of such strength that it will not yield or bend in ordinary use while at the same time being preferably formed of more or less resilient metal to permit the device to be slightly flexed and sprung into place.

The protector consists of a metallic member or wire 17 bent into proper shape to conform, more or less, with the configuration of the bottom of the vessel or pot so as to extend throughout the bottom as shown in Figure 1; the rod or wire being formed with the two arcuate ends or portions 18, 18 which conform to the curvature of the forward and rear walls of the vessel; and with the straight sides 19, 19 which extend throughout the longitudinal length of the vessel as shown in Figure 1.

My improved device or protector is preferably constructed from a single rod or wire bent as shown and described, having been cut to a length commensurate with the longitudinal and transverse dimensions of the vessel or pot, with the two ends of the wire or rod, after the same has been formed in to the desired shape, integrally secured together by weld brazing or in any other suitable manner to provide a continuous or endless loop.

The device is made of a size slightly greater than the distance from front to rear of the bottom of the vessel in order that the arcuate or bowed ends 18, 18 will spring into frictional holding relation with the chime 15 of the vessel or pot and thus securely hold the protector in place. The device or protector is formed so that the longitudinal side portions 19, 19 are offset and disposed in a lower horizontal plane than the arcuate end portions 18, 18. That is to say, the protector or device, adjacent to the arcuate end portions 18, 18, is bent downwardly as shown at 20 in Figures 2 and 3, at both sides of the device so as to have the longitudinal or straight side portions 19, 19 extend into a plane below that of the chime of the vessel or pot, as shown in Figures 2 and 3, and thus provide a rest or support for the vessel or pot which prevents contact with the base of the vessel, thereby protecting the latter from wear during its use.

By bending the device as shown and described, in addition to providing the extended rest or support portions 19, 19, flexing of the device is permitted to enable the device to be sprung into place beneath the bottom proper of the vessel and the arcuate ends caused to spring into firm holding relation with the chime of the vessel or pot and thus be held in place without the necessity of welding or employing any other means for maintaining the protector in position. With the longitudinal sides 19, 19 formed as shown and described, namely without having said sides 19, 19 spread into close relation with the chimes or base flanges of the vessel, easy application and ready removal of the protector is possible.

It is apparent that my improved protector may be given any configuration or shape conforming more or less with the shape and size of the vessels to which it is to be applied and that the cross-sectional configuration of the rod or wire, from which the device is made, may be varied; the cross-sectional configuration of the rod or wire preferably, however, being such that the formed or completed device will possess sufficient resiliency and permit sufficient flexing to enable insertion of the protector into place.

I have shown and described what I believe to be the simplest and best embodiment of my invention, but modifications are possible and may be made without, however, departing from the spirit of my invention.

What I claim is:—

1. A device of the character described consisting of resilient wear resisting material bent into loop form with the ends integrally united, the ends of the loop being made to conform with the shape of the base flanges or chimes of the vessel, the loop adjacent to said ends and at opposite sides of the loop being bowed downwardly to provide side portions disposed in a lower horizontal plane.

2. A device of the character described consisting of a metallic loop having two opposite ends conforming with the shape of the bottom flanges or chimes of a vessel and to be in frictional holding relation therewith and having two opposite sides disposed in a plane beneath that of the said end portions.

3. A device of the character described composed of a wire or metallic rod bent into loop form with the ends arranged in abutting relation and integrally connected, two opposite sides of the loop being shaped to conform with the shape of the bottom flanges or chimes of a vessel so as to extend in firm frictional relation therewith while the other two opposite sides of the loop extend throughout a longitudinal plane beneath said first mentioned two sides and adapted to be disposed below the bottom flanges or chimes of a vessel.

4. A device for supporting vessels, consisting of a metallic ring provided with engaging portions arranged in one plane and adapted to have frictional engagement with the bottom flanges of the vessel, and provided with two opposite sides disposed in a plane beneath that of said engaging portions to constitute the vessel supporting portions.

KARL PILLER.